(12) United States Patent
Fell et al.

(10) Patent No.: US 7,734,608 B2
(45) Date of Patent: Jun. 8, 2010

(54) SYSTEM, METHOD AND COMPUTER PROGRAM PRODUCT FOR QUERYING DATA RELATIONSHIPS OVER A NETWORK

(75) Inventors: Simon Z. Fell, San Francisco, CA (US); Benji H. Jasik, San Francisco, CA (US); Sven E. Mawson, Los Angeles, CA (US); Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 161 days.

(21) Appl. No.: 11/534,510

(22) Filed: Sep. 22, 2006

(65) Prior Publication Data

US 2008/0077566 A1 Mar. 27, 2008

(51) Int. Cl.
G06F 17/30 (2006.01)
G06F 17/00 (2006.01)

(52) U.S. Cl. .................... 707/705; 715/200
(58) Field of Classification Search ............. 707/1–6
See application file for complete search history.

(56) References Cited

U.S. PATENT DOCUMENTS

| | | | | |
|---|---|---|---|---|
| 6,366,934 | B1 * | 4/2002 | Cheng et al. ............. | 715/210 |
| 6,732,100 | B1 * | 5/2004 | Brodersen et al. ........ | 707/9 |
| 6,823,384 | B1 * | 11/2004 | Wilson et al. ............ | 709/225 |
| 7,337,164 | B2 * | 2/2008 | Radestock et al. ........ | 707/3 |
| 2003/0233404 | A1 | 12/2003 | Hopkins ................... | 709/203 |
| 2004/0210909 | A1 | 10/2004 | Dominguez, Jr. et al. ... | 719/316 |
| 2005/0065925 | A1 | 3/2005 | Weissman et al. ......... | 707/4 |
| 2005/0223022 | A1 | 10/2005 | Weissman et al. ........ | 707/102 |
| 2005/0283478 | A1 | 12/2005 | Choi et al. ............... | 707/9 |

OTHER PUBLICATIONS

Powell, "DIME: Sending Binary Data with Your SOAP Messages," Jan. 22, 2002, Microsoft Corporation, http://msdn.microsoft.com/enus/library/aa480488.aspx.
Gailey, "DIME: Sending Files, Attachments, and SOAP Messages Via Direct Internet Message Encapsulation," copyright 2009 Microsoft Corporation, http://msdn.microsoft.com/en-us/magazine/cc188797.aspx.
Onion, "Hierarchical Data Binding in ASP.NET," copyright 2009 Microsoft Corporation, http://msdn.microsoft.com/en-us/library/aa478959.aspx.
Dhawan, "Performance Comparison: Exposing Existing Code as a Web Service," Oct. 2001, Microsoft Corporation, http://msdn.microsoft.com/enus/library/ms978401.aspx.
Chong et al., "Multi-Tenant Data Architecture," Jun. 2006, Microsoft Corporation, http://msdn.microsoft.com/en-us/library/aa479086.aspx.
"Microsoft SQL Server," copyright 2009 Microsoft Corporation, http://msdn.microsoft.com/en-us/library/bb545450.aspx.

* cited by examiner

*Primary Examiner*—Yicun Wu
(74) *Attorney, Agent, or Firm*—Zilka-Kotab, PC (57) ABSTRACT

In accordance with embodiments, there are provided mechanisms and methods for querying data relationships over a network. These mechanisms and methods for querying data relationships over a network can enable embodiments to provide the capability to query for more than a single entity at a time. The ability of embodiments to query for more than a single entity at a time can enable improved network throughput, faster response time and more efficient utilization of resources.

22 Claims, 7 Drawing Sheets

SYSTEM, METHOD AND COMPUTER PROGRAM PRODUCT FOR QUERYING DATA RELATIONSHIPS OVER A NETWORK

FIELD OF THE INVENTION

The present invention relates to database queries, and more particularly to querying data relationships over a network.

BACKGROUND

In conventional client-server systems, queries to a database typically involve a request that is transmitted from a client to a server equipped with a database. In response to such request, various data in the database may be transmitted from the server to the client. Such queries are typically carried out utilizing a structured query language (SQL), which constitutes a language that provides an interface to the database.

In modern database systems, various relationships may exist between data entities (e.g. accounts, contacts, other objects, etc., in the database. For example, one particular account may have relationships with other entities that include a large number of related contacts.

Unfortunately, in conventional approaches, such related data must be queried separately. For example, if a client desired to obtain data associated with the particular account in addition to the related contacts, a first query would be required to retrieve the data associated with the account and a second query would be required to obtain the data associated with the related contacts. Further, the client would have to be configured to combine the data associated with such entities after receipt.

Thus, in traditional approaches, a large number of queries may be required to obtain data on related entities. Such additional queries can be problematic, particularly when communicating large amounts of data over a certain network architectures or topologies, such as for example, a wide area network (WAN), because of the possibility of latent behavior of the network (i.e. delays due to asynchronous operation, etc. For example, if there is a particular latency associated with one query over a network, such latency is compounded by the foregoing use of multiple queries (each with their own latency).

There is thus a need for overcoming these and/or other problems associated with the prior art.

SUMMARY

In accordance with embodiments, there are provided mechanisms and methods for querying data relationships over a network. These mechanisms and methods for querying data relationships over a network can enable embodiments to provide the capability to query for more than a single entity at a time. The ability of embodiments to query for more than a single entity at a time can enable improved network throughput, faster response time and more efficient utilization of resources.

In an embodiment and by way of example, a method for querying data relationships over a network is provided. The method embodiment includes receiving a query including at least one relationship between a first entity and a second entity over the network. Only that amount of data related to the first entity and the second entity that is able to be efficiently returned responsive to the query is retrieved from at least one database. In response to the query, data related to the first entity and the second entity is transmitted over the network.

While the present invention is described with reference to example embodiments in which techniques for querying data relationships over a network implement the Salesforce Object Query Language (SOQL) a query language for querying data over a network by salesforce.com®, inc. of San Francisco, Calif., the present invention is not limited to embodiments that implement SOQL Embodiments may be practiced using other query languages, i.e., SQL and the like without departing from the scope of the embodiments claimed.

DETAILED DESCRIPTION

In embodiments, there are provided mechanisms and methods for querying data relationships over a network.

Because relationships may exist between data entities, e.g. accounts, contacts, other objects, etc., in a database, methods and mechanisms provided by embodiments can query data based upon the relationship. An example scenario includes one particular account that may have relationships with other entities that include a large number of related contacts. Specifically, where each account is associated with a company; the first query may be required to identify a name, number of employees, annual revenue, business address, website, phone, etc. associated with a particular company account. Further, the aforementioned contact-related data may include a name, address, phone number, e-mail address, birthday, etc. Thus, conventionally, not only would a query be required to obtain the account-related data, but another query would be required to obtain a list of the contacts and contact-related data for such account.

Further, if 100 accounts exist, 101 queries would be required using conventional approaches, namely one query for the list of accounts (and account-related data), and one query to obtain the contacts (and contact-related data) for each account. Still yet, the number of required queries increases geometrically down the related object tree. For instance, if each account has 10 contacts each with 10 children objects; one query would be required for the list of accounts (and account-related data), and 100 queries would be required for the lists of contacts (and contact-related data) multiplied by 10 queries for the list of children objects (and children object-related data) for each contact, amounting to at least 1000 queries. The following example embodiments illustrate methods and mechanism that enable querying data relationships over a network to overcome the aforementioned drawbacks.

Figure 1:
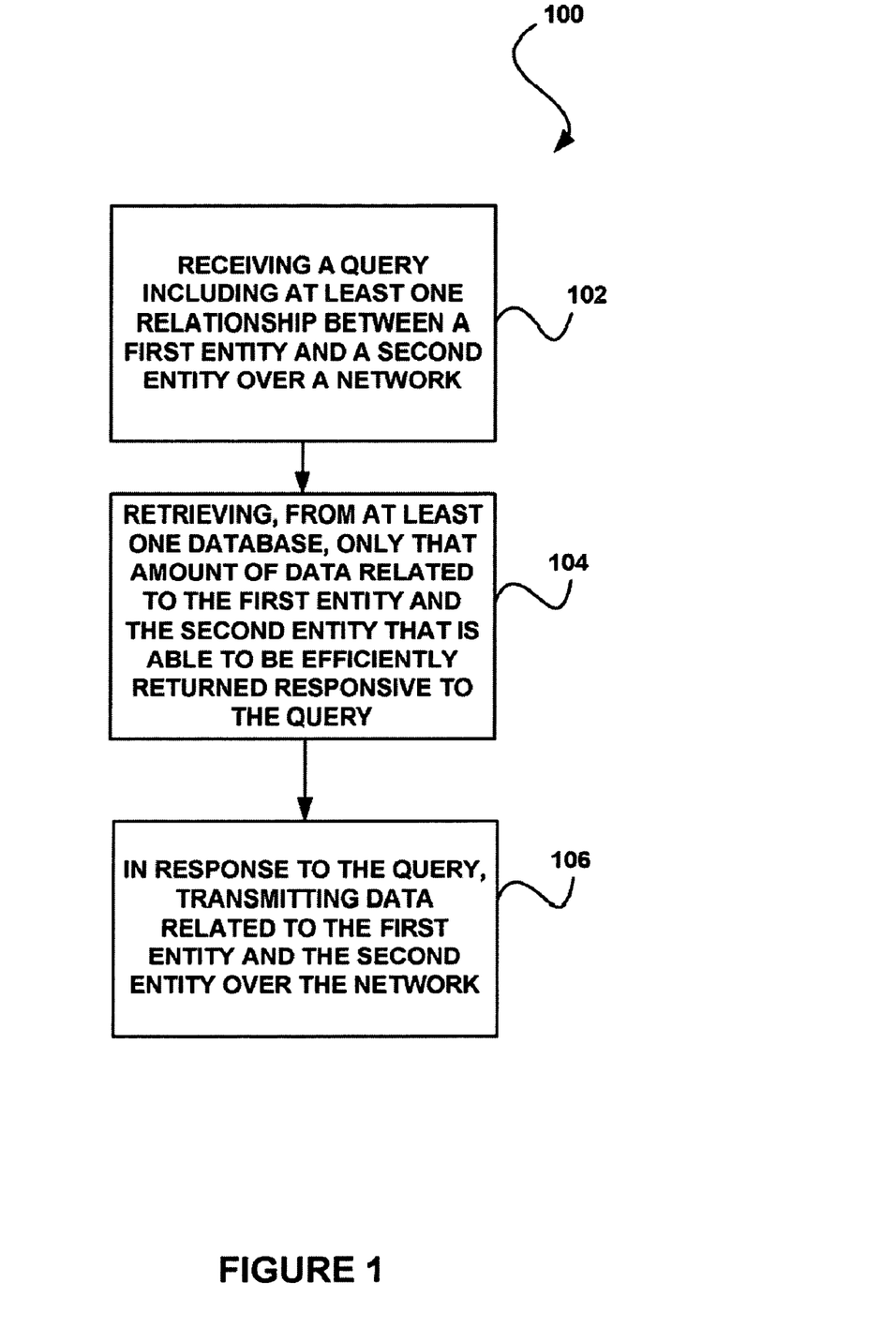
FIG. 1 illustrates an example method for querying relationships over a network in one embodiment.

FIG. 1 illustrates a method 100 for querying relationships over a network in one embodiment. As shown, a query including at least one relationship between a first entity and a second entity is received over a network. Note operation 102.

In the context of the present description, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Also in the context of the present description, the term entity may refer to anything of real and/or conceptual significance about which data is stored. In one embodiment where the query is directed to a multi-tenant database system, such entities may include an account, a contact, and/or any other object that is significant to a tenant of the system. More information regarding such a multi-tenant database system will be set forth during reference to FIGS. 5-6. In still other embodiments, the entities may include a standard, e.g. pre-defined, etc., entity, a custom, e.g. defined by a user, etc., entity, or even exhibit a hierarchical, e.g. parent-child, etc., relationship. Of course, in other embodiments, the entities may refer to any person, place, thing, and/or anything else that meets the aforementioned definition.

Again in the context of the present description, the term network may include any geographically dispersed network. Just by way of example, a network may include a WAN or two or more local area networks (LANs). For that matter, in some embodiments, the network may include any network larger than a LAN. For instance, the network may include a metropolitan area network (MAN). Of course, in some embodiments, the network may include one or more heterogeneous networks including, but not limited to a wireless network, point-to-point network, star network, token ring network, hub network, and/or any other network configuration, etc. In one embodiment, the network may be asynchronous in nature and/or exhibit some latency. It should be noted, however, that the foregoing examples of networks are set forth for illustrative purposes only and should not be construed as limiting in any manner, since the network may include any geographically dispersed network, per the above definition.

Yet further, in the context of the present description, the term query denotes any search, attempted search or request for information within the database. Queries may be written in a query language. While any desired query language may be utilized, one example query language will be discussed hereinafter in greater detail. The query may be received utilizing a web services protocol. Such web services protocols may include the simple object access protocol (SOAP), extensible markup language (XML), TCP/IP, HTTP, Java™, HTML, practical extraction and report language (PERL), common gateway interface (CGI), etc. Of course, other web services protocols are also contemplated. (Java™ is a trademark of Sun Microsystems, Inc., of Sunnyvale, Calif.).

Only that amount of data related to the first entity and the second entity that is able to be efficiently returned responsive to the query is retrieved from at least one database. See operation 104. Embodiments can determine based upon the relationship and any inherent characteristics of the network an amount of data to be returned as a "chunk" that will reduce responsive transactions to return the data, thereby improving efficiency, as will be described further herein below with reference to FIGS. 3A-3C. Remaining data may be stored temporarily using a process called cursoring, which will be described further herein below with reference to FIG. 4.

In response to the query, data related to the first entity and the second entity is transmitted over the network. See operation 106. Such data may include any digital information. Further, the entities may be related in any capacity. Thus, in some embodiments, one may be able to query for more than a single entity at a time. For example, the data related to the first entity and the second entity may be transmitted in response to a single query. To this end, fewer queries are required which, in turn, enhances an embodiment's ability to transmit data over the network.

More illustrative information will now be set forth regarding various optional architectures and uses in which the foregoing method 100 may be implemented. For instance, more information will be set forth regarding naming the aforementioned relationship and describing the same in the context of a web services description language, adapting an associated query language for querying the relationship, generating the queries, cursoring over entities, etc. In one embodiment, the aforementioned method 100 may be implemented in the context of the Salesforce Object Query Language (SOQL) in a manner that will be elaborated upon later.

It is noteworthy, however, that the following information is set forth for illustrative purposes and should not be construed as limiting in any manner. Any of the following features may be optionally incorporated with or without the remaining features described.

Figure 2:
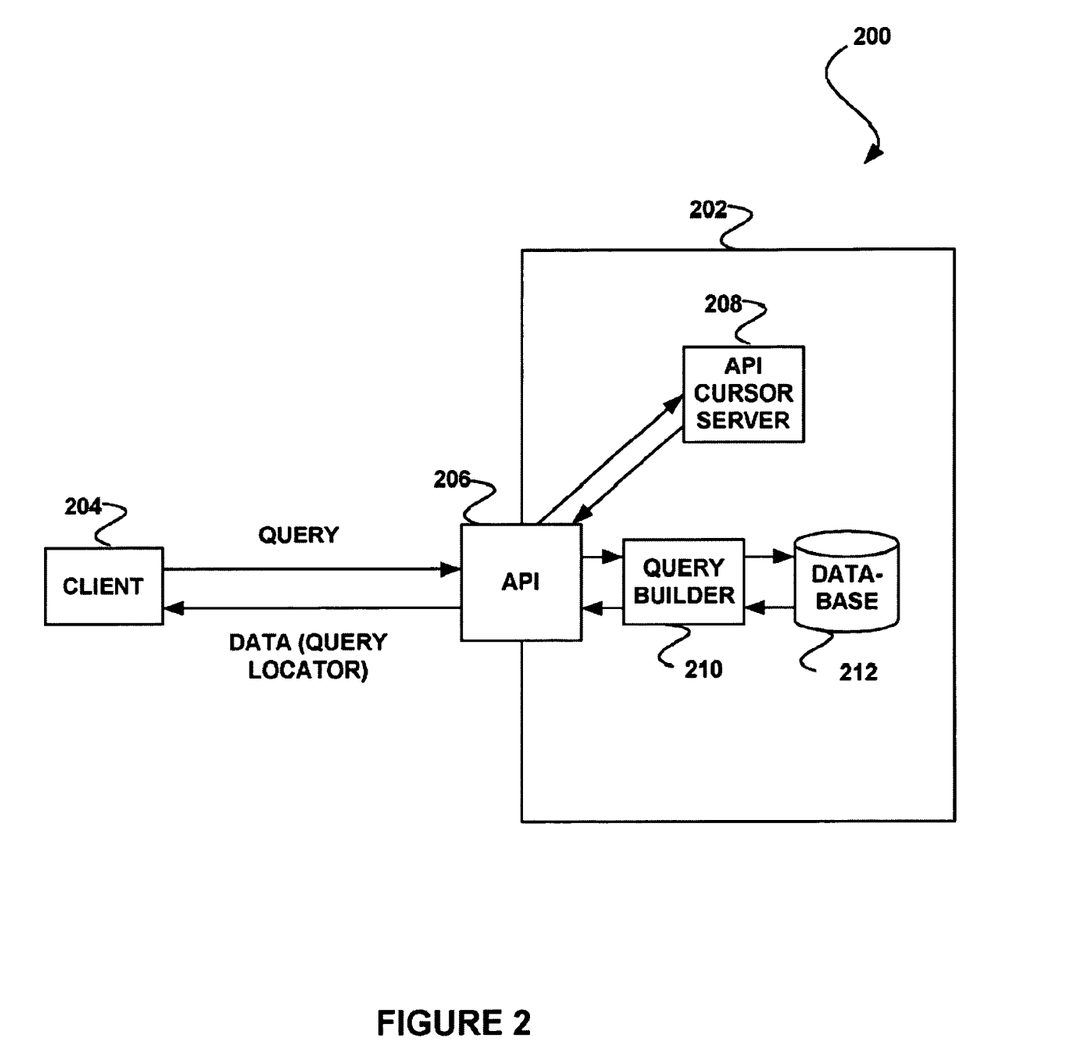
FIG. 2 illustrates an example architecture for querying relationships over a network in an embodiment

FIG. 2 illustrates an architecture 200 for querying relationships over a network in an embodiment. As an option, the architecture 200 may be used to carry out the method 100 of FIG. 1. Of course, however, the architecture 200 may be implemented in any desired environment. The aforementioned definitions may equally apply to the description below. As shown, the architecture 200 includes a system 202 including an application program interface (API) cursor server 208. A database 212 is provided which interfaces a query builder 210. As will soon become apparent, the API cursor server 208 may include any entity capable of offloading the database 212 and/or caching query results. Further included is an API 206 for interfacing both the query builder 210 and the API cursor server 208. In one embodiment, the database 212 may be realized as a multi-tenant database system. More information regarding such a multi-tenant database system will be set forth during reference to FIGS. 5-6.

In use, a client 204 (and even multiple clients) may use the system 202 to store data in the database 212, and further retrieve data associated with a particular tenant of the system 202. As mentioned earlier, various entities (and their relationships) may be stored and managed in the database 212.

Figure 3A:
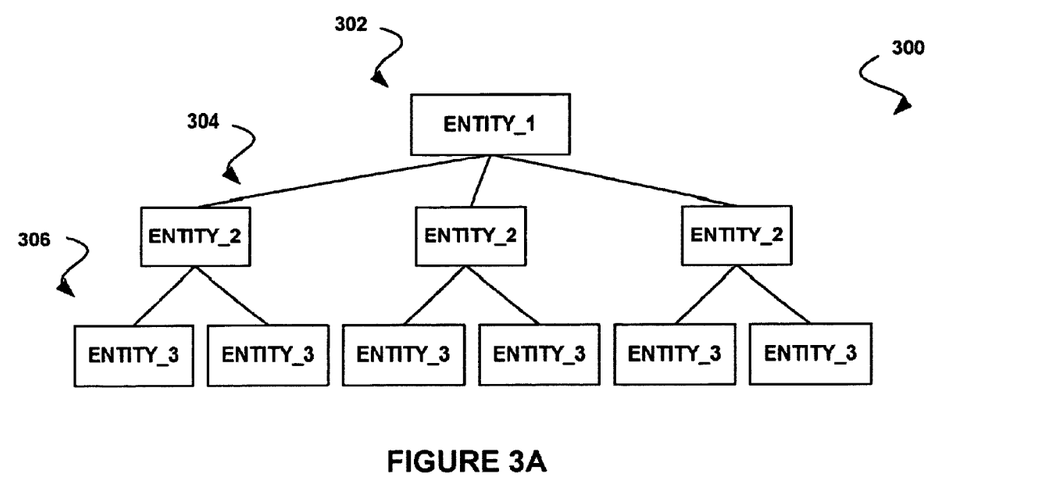
FIG. 3A illustrates a sample data framework including a plurality of entities with various relationships shown therebetween.

FIG. 3A illustrates a sample data framework 300 including a plurality of entities 302, 304, 306 with various relationships shown therebetween. As an option, such relationships may be hierarchical in nature, in the manner shown. Table 1 illustrates various specific examples of entities that may be implemented in a multi-tenant database system.

TABLE 1

| Entity_1 | Account |
| Entity_2 | Contacts |
| Entity_3 | Custom Objects |

In one example embodiment involving the above entities, accounts may have multiple contacts which, in turn, have multiple instances of a custom object. One example of a custom object may include a "raining certification" which may store data about which certification classes a contact has completed. For example, such custom object may include fields such as "class name," "date complete," "exam score," etc. In various embodiments, a contact may have multiple child rows, one for each training certification completed. For reasons that will soon become apparent, the various relationships shown in FIG. 3A may be labeled.

Figure 3B:
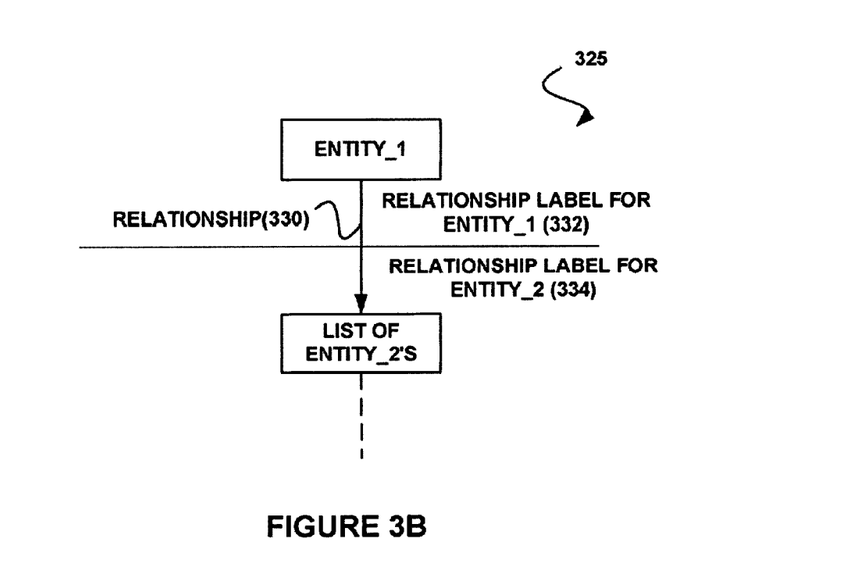
FIG. 3B illustrates a sample naming framework for uniquely labeling relationships among a plurality of entities in an embodiment.

FIG. 3B illustrates a sample naming framework 325 for uniquely labeling relationships among a plurality of entities. As shown, a relationship 330 exists between two sets of entities. Further, a first label 332 is assigned to the first entity for identifying the relationship and a second label 334 (different from the first label 332) is assigned to the second entity also for identifying the relationship. Thus, in one embodiment involving a parent—multiple child relationship, a label unique to each child may be provided for the parent, and a label unique to the parent may be provided for the list of children. Using this feature, queries may traverse between the parent and the various children. Of course, in other embodiments, any of a plurality of other mechanisms, such as pointers or the like may be used amongst the entities.

With reference again to FIG. 2, the client 204 may leverage the aforementioned relationships in querying data during use. Specifically, the client 204 may generate a query including the relationship and transmit the same to the system 202 for receipt by the API 206. In one embodiment, such query may include a single query for data associated with multiple related entities by naming the appropriate labels. As an option, the incorporation of the relationship into the query may be accomplished by extending an existing query language. One specific, example technique for extending a query language for such purpose is set forth below with reference to Tables A1-A5.

Related lists, e.g. child relationships, etc., may be accessed by using parenthetical (( )) syntax in a select clause. Parent relationships may be accessed by dot (.) notation. In general, one possible query language embodiment may support the following features of Table A1.

TABLE A1

1. one-to-one or many-to-one relationships can be specified directly in the SELECT, FROM, or WHERE clauses using the dot "." operator.
2. one-to-many relationships may be specified using a subquery, where the initial member of the FROM clause in the subquery is related to the initial member of the outer query's FROM clause.
3. WHERE clauses can be placed on any query (including subqueries), and apply to the root element of the FROM clause of the current query. These clauses can filter on any entity in the current scope (reachable from the root element of the query).

Table A2 illustrates examples of querying a parent relationship.

TABLE A2

SELECT id, lastname, contact.account.name FROM contact, contact.account;
SELECT id, lastname, a.name FROM contact, contact.account a;
SELECT id, lastname, a.name FROM FROM c, c.account a;
SELECT id, lastname, account.name from contact c;

Table A3 illustrates examples of querying a child relationship.

TABLE A3

SELECT id, (SELECT id, pe.id, p2.id from
o.OpportunityLineItems items,
items.PricebookEntry pe, pe.product2 p2) from Opportunity o;

Table A4 illustrates examples of using a related list relationship, e.g. one-to-many join, or children.

TABLE A4

SELECT id, name, (SELECT c.firstname,c.lastName FROM
a.contacts c) FROM Account a;
SELECT id, name, (SELECT contacts.firstname, contacts.lastName
FROM Account.contacts) FROM Account;

Table A5 illustrates examples of querying a parent and child relationship, e.g. one-to-many and one-to-one join.

TABLE A5

SELECT id, name, (SELECT c.firstname, c.lastName,
account.name FROM Account.contacts c, c.Account) FROM Account;
SELECT o.amount, o.description,
  (SELECT I.listPrice, I.Quantity,
    d.name, d.productCode,
    c.firstName, c.lastName
  FROM o.OpportunityLineItems I,I.Product d, I.CreatedBy c
  WHERE I.quantity > 10
  AND d.productCode = '10556'
  AND c.lastName = 'Johnson'),
 (SELECT p.role
  FROM o.Partners p
  WHERE p.role = 'MoneyMaker')
 FROM Opportunity o
 WHERE o.amount > 10000;

Upon receipt of the query, the API 206 processes the same. For example, the query may be forwarded to the query builder 210 for translating such query in a manner that is appropriate for querying the database 212. While the query builder 210 may take any desired form, it may, in one embodiment, query builder 210 incorporates one or more features described in U.S. Patent Application Publication 2005/0065925 filed Sep. 23, 2003 and entitled "QUERY OPTIMIZATION IN A MULTI-TENANT DATABASE SYSTEM," which is incorporated herein by reference in its entirety.

In one example of use, the client 204 may generate and transmit a first type of query, e.g. utilizing an extended simple query language (SQL), etc., adapted for use over a network, while the query builder 210 may translate such first type of query into one or more queries, e.g. database queries, etc., of a second type which are specifically tailored for querying the database 212 directly using various join conditions, etc. Due to specific protocol requirements, a single query of the first type from the client 204 may translate into multiple queries of the second type, under the direction of the query builder 210. Of course, such feature may be acceptable since the multiple queries are not necessarily communicated over the network.

In response to one or more queries from the query builder 210, data related to the entities associated with the initial query is provided for being returned to the client 204. In an embodiment, the data may be presented to the client 204 utilizing an appropriate description language, e.g. XML, web services description language (WSDL), etc., which may be extended by incorporating the aforementioned relationship among the related entities. One specific example technique for extending such a description language for such purpose is set forth in below with reference to Table B1.

In WSDL, two changes may be provided. One-to-many relationships may show up as array fields on their parents. Table B1 illustrates an example manner in which an entity named "account" may appear.

TABLE B1

<element name="contacts" type="ens:Contact" nillable="true" minOccurs="0" maxOccurs="unbounded"/>
    For parent relationship(Contact to Account), the entry will like:
    <element name="account" type="ens:Account" nillable="true" minOccurs="0" maxOccurs="1"/>

As previously described, the client 204 can cursor over a plurality of entities, e.g. parent and/or child entities) by using the aforementioned relationship. In other words, the client 204 can, for example, request all of the top-level entities corresponding to its tenancy (of which there may be many), request all of the lower-level entities, e.g. children, grandchildren, etc., associated with one or more of the top-level entities (of which there may be even more), and so forth.

Such cursoring results can potentially render a large data set being requested from the system 202 and transmitted over the network. Since it is not necessarily efficient (in some embodiments) to transmit an entirety of such large data set to the client 204 in a single transmission, the system 202 may be adapted to divide such data set into subsets, e.g. "chunks," etc., which may be more feasibly sent to the client 204 one-at-a-time. Thus, before transmission, the system 202 may determine whether the data is larger than a determined amount. If not, the data may simply be transmitted via the API 206 to the client 204 as a single transmission. On the other hand, if the system 202 determines that the data resulting from the query is larger than the determined amount, the data may be divided into chunks of a specific size, and individually transmitted via the API 206 to the client 204.

Figure 3C:
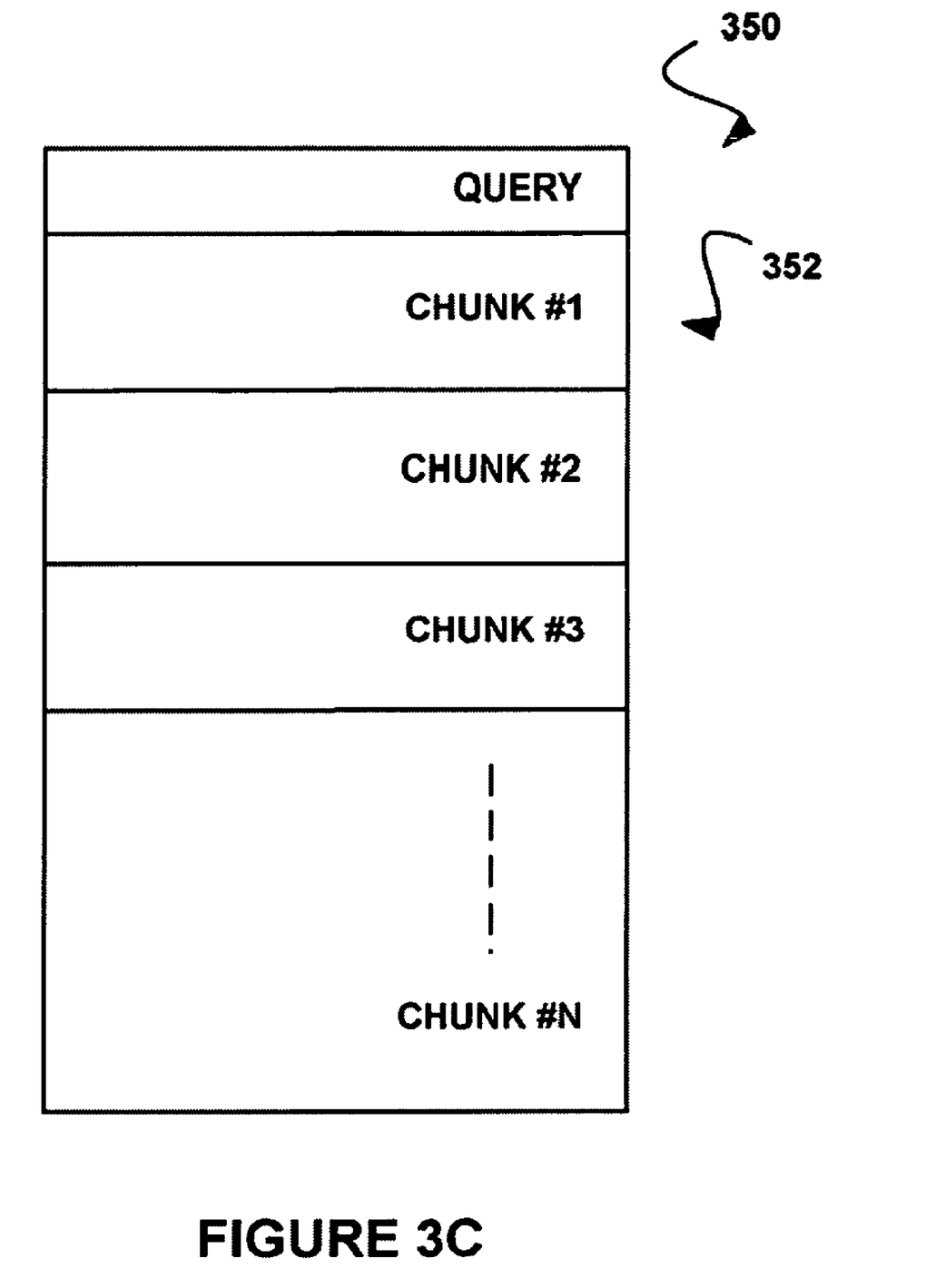
FIG. 3C illustrates an example query and the manner in which the same may be divided into multiple chunks in an embodiment.

FIG. 3C illustrates an example query 350 and the manner in which the same may be divided into multiple chunks 352. Specifically, in the context of one example, a first chunk may be transmitted from the client 204 along with a query locator. Such query locator may include a pointer that identifies a subsequent chunk, and may be used to trigger the transmission of such chunk upon receipt of the query locator. By this feature, the client 204, upon receipt of the present chunk, may request a subsequent chunk by sending a specific request incorporating the query locator appended to the present chunk. Of course, if for some reason no more data is required, e.g. a query is cancelled, the client 204 disconnected, etc., the specific request incorporating the query locator may not necessarily be returned, thus aborting the transfer of data In an embodiment, the query locator may include the aforementioned relationship (similar to the initial query) so that additional data associated with particular related entities may be retrieved in the above manner, To this end, the query locator may be used to retrieve data associated with any desired related entity.

To accommodate and manage the above-described chunking, the API cursor server 208 may possibly divide up cursors associated with an incoming query and store a state of such cursor components while related data is being transmitted. For example, if a parent entity and each of a plurality of related child entities correlate with a large amount of data, e.g. greater than the aforementioned "chunk"-size, for example, the API cursor server 208 may cursor the data associated with the different entities separately. Further, as the chunks are transmitted, the associated cursor and/or cursor components may be cleaned up to improve resource utilization. More information regarding the manner in which the system 202 and, in particular, the API cursor server 208 is capable of accommodating cursoring in the foregoing manner will be set forth in greater detail during reference to FIG. 4, In various embodiments, the foregoing example of use may further incorporate additional features which may be found during reference to U.S. Patent Application Publication 2005/0283478 filed Jun. 16, 2004 and entitled "SOAP-BASED WEB SERVICES IN A MULTI-TENANT DATABASE SYSTEM," which is incorporated herein by reference in its entirety. In particular, note FIG. 7 of such reference.

While the queried data may take any form, it may, in some embodiments be embellished, enhanced, etc., utilizing a describe call. In the context of the present description, such describe call may refer to any call that requests additional data, e.g. a describe object, etc., regarding a particular entity, etc. Table 2 illustrates an example describe object.

TABLE 2

1) identifying information, e.g. name, custom, label)
2) operations that can be performed on each SOAP object, e.g. create, retrieve, query, delete, etc.,
3) set of fields available for a given SOAP object, including:
    a. identifying information, e.g. name, custom, label, etc.
    b. operations that can be performed on each field, e.g. create, update, etc.
    c. generic data properties, e.g. type, soapType, nillable, etc.
    d. type-specific properties, e.g. scale, precision for numbers, length for strings, possible set of values for enums, picklists, etc.

More information regarding such describe object may be found with reference to the abovementioned related application which is incorporated herein by reference. While not shown, the foregoing describe call and/or object may further identify the aforementioned relationship with any other one or more entities, for allowing additional information to be queried utilizing such relationship.

Using these features, a lesser number of queries may be required. For example, in the context of the illustration provided earlier where at least 1000 queries were necessary, only a single query may be used for obtaining the relevant data. To this end, by reducing the number of queries (and any latency associated with such omitted queries), the overall latency exhibited when retrieving data may optionally be reduced.

Figure 4:
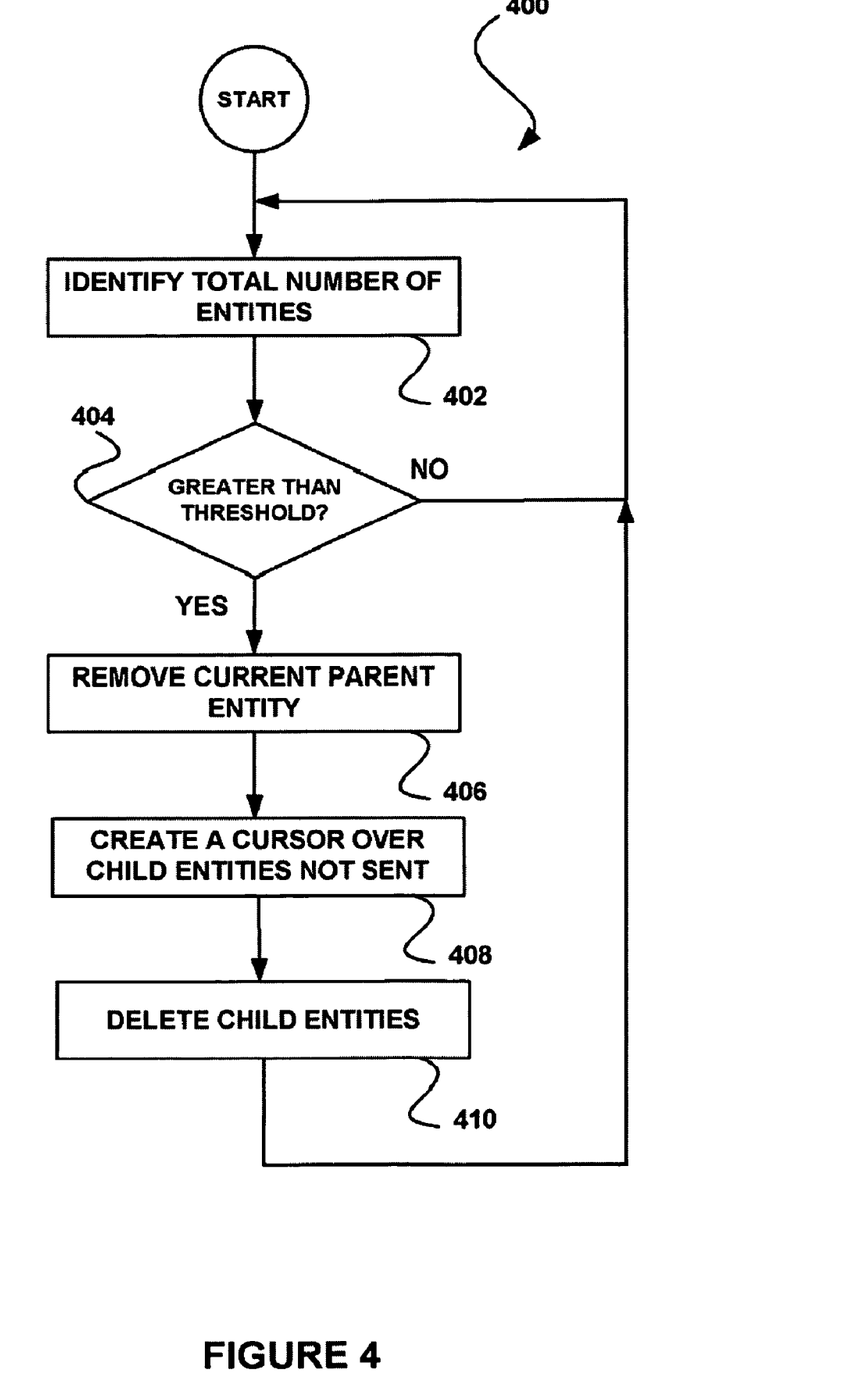
FIG. 4 shows a method for managing cursors utilizing a server, in one embodiment.

FIG. 4 shows a method 400 for managing cursors in one embodiment. As an option, the method 400 may be implemented in the context of the details of FIGS. 1-3. Of course, however, the method 400 may be carried out in any desired environment. Again, the aforementioned definitions may equally apply to the description below.

In one embodiment, the present method 400 may be carried out in the context of the system 200 of FIG. 2 and, in particular, the API cursor server 208 thereof. Specifically, the method 400 may be carried out to manage cursors associated with a query received from a client, e.g. see, for example, the client 204 of FIG. 2, etc. As will become apparent, a size of each cursor may be quite large and thus require careful management.

As shown, a total number of the entities, e.g. parent entities, child entities, etc., associated with a particular cursor is tracked. Note operation 402, Of course, such total number may vary based on the parameters of a query by the client. For instance, in an example where the query involves a parent entity such as an account inclusive of hundreds of child entities such as contacts which are, in turn, inclusive of hundreds of custom entities; a number of entities associated with the cursor can obviously be quite large.

Since a large number of entities requires a larger amount of processing and/or storage resources, it is determined in decision 404 whether such total number exceeds a predetermined threshold. Such predetermined threshold can be a particular number, e.g. 2000, etc., that is selected to optimally manage system resources or may be selected based on a batch size, a combination of both, e.g. whichever is less), etc.

If such threshold is exceeded per decision 404, a current parent entity may be removed per operation 406, and a cursor may be established over a plurality of child entities that have yet to be sent to the client. See operation 408. To this end, child entities may be deleted, per operation 410 whenever the parent cursor is advanced. In use, the method 400 may be capable of handling multiple child cursors associated with the same parent entity (up to some limit).

Figure 5:
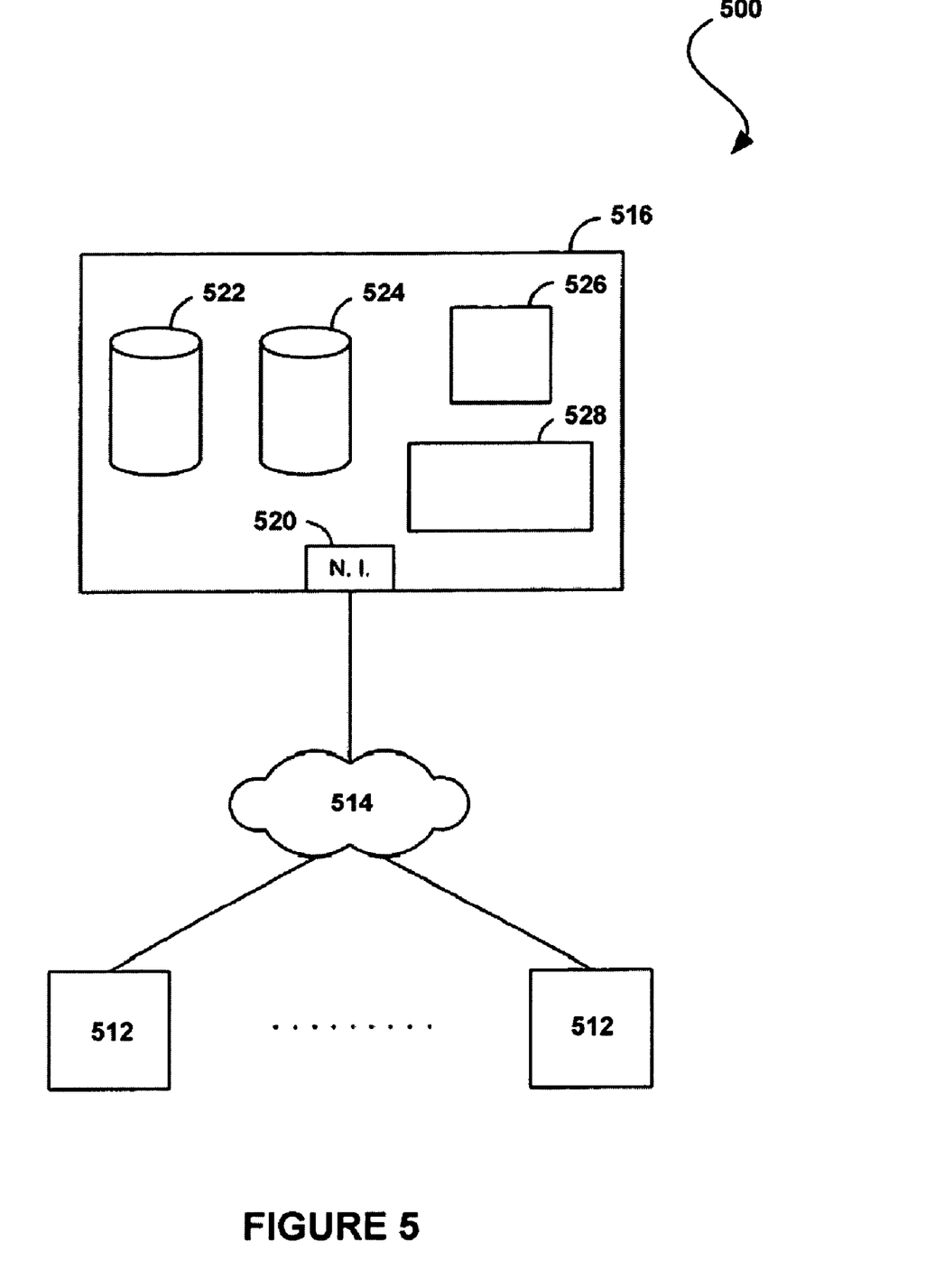
FIG. 5 illustrates elements of a multi-tenant database system and various interconnections, in one embodiment.

FIG. 5 illustrates an environment 500 where a multi-tenant database system might be used. As an option, the environment 500 may be implemented in the context of the details of FIGS. 1-4. Of course, however, the environment 500 may be used in any desired environment. Again, the aforementioned definitions may equally apply to the description below.

Figure 6:
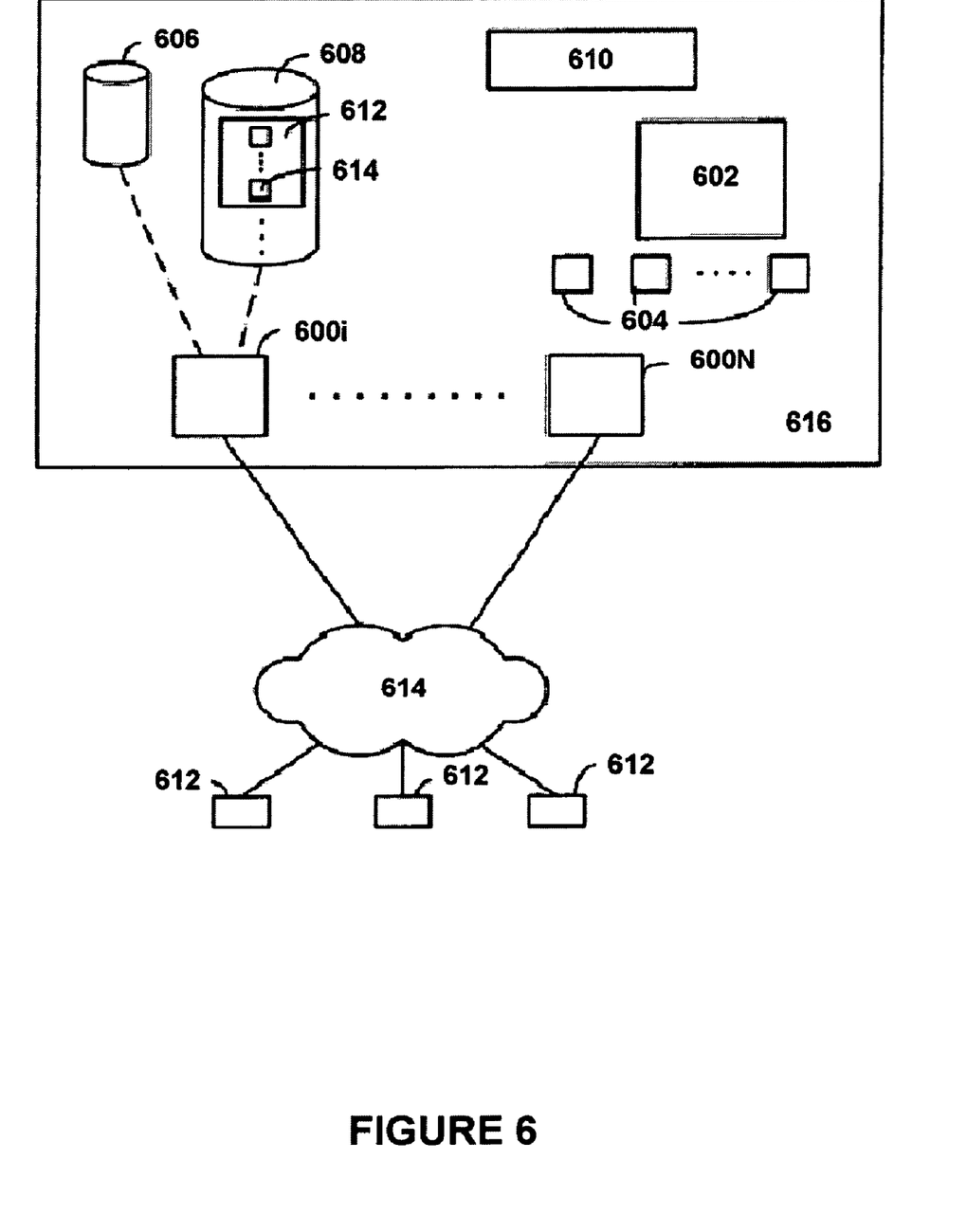
FIG. 6 illustrates elements of a multi-tenant database system and various interconnections in another embodiment.

As illustrated in FIG. 5 and FIG. 6 one or more clients 512 might interact via a network 514 with a multi-tenant database system (MTS) 516. The network 514 can be a network, as set forth earlier. The users of those clients 512 might be users in differing capacities and the capacity of a particular client 512 might be entirely determined by the current user. For example, where a salesperson is using a particular client 512 to interact with the MTS 516, that client has the capacities allotted to that salesperson. However, while an administrator is using that client to interact with the MTS 516, that client has the capacities allotted to that administrator.

The clients 512 might communicate with the MTS 516 using TCP/IP and, at a higher network level, use other common Internet protocols to communicate, such as HTTP, FTP, AFS, WAP, etc. As an example, where HTTP is used, the client 512 might include an HTTP client commonly referred to as a "browser" for sending and receiving HTTP messages from an HTTP server at the MTS 516. Such HTTP server might be implemented as the sole network interface between the MTS 516 and network 514, but other techniques might be used as well or instead.

In some implementations, the interface between the MTS 516 and network 514 includes load sharing functionality, such as round-robin HTTP request distributors to balance loads and distribute incoming HTTP requests evenly over a plurality of servers. In one embodiment, each of the plurality of servers has access to the MTS's data, at least as for the users that are accessing that server.

In various optional aspects, the system shown in FIG. 5 implements a web-based customer relationship management (CRM) system For example, in one aspect, the MTS 516 can include application servers configured to implement and execute CRM software applications as well as provide related data, code, forms, web pages and other information to and from the clients 512 and to store to, and retrieve from, a database system related data, objects and web page content. With a multi-tenant database system, tenant data is arranged so that data of one tenant is kept separate from that of other tenants so that one tenant does not have access to another's data, unless such data is expressly shared.

One arrangement for elements of the MTS 516 is shown in FIG. 5, including a network interface 520, storage 522 for tenant data, storage 524 for system data accessible to the MTS 516 and possibly multiple tenants, program code 526 for implementing various functions of the MTS 516, and a process space 528 for executing MTS system processes and tenant-specific processes, such as running applications as part of an application service.

According to one embodiment, each client 512 and all of its components are operator configurable using applications, such as a browser, including computer code run using a central processing unit such as an Intel Pentium® processor or the like. Similarly, the MTS 516 (and additional instances of MTS's, where more than one is present) and all of their components might be operator configurable using application(s) including computer code run using a central processing unit such as an Intel Pentium® processor or the like, or multiple processor units.

Computer code for operating and configuring the MTS 516 to intercommunicate and to process web pages and other data and media content as described herein is downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g. over the Internet, or from another server, as is well known, or transmitted over any other conventional network connection as is well known, e.g. extranet, VPN, LAN, etc., using any communication medium and protocols, e.g. TCP/IP, HTTP, HTTPS, Ethernet, etc., as are well known. It will also be appreciated that computer code for implementing aspects of the present invention can be implemented in any programming language that can be executed on a server or server system such as, for example, in C, C++, HTML, Java, JavaScript, any other scripting language, such as VBScript and many other programming languages as are well known.

According to one embodiment, each MTS 516 is configured to provide web pages, forms, data and media content to the clients 512 to support the access by the clients 512 as tenants of the MTS 516. As such, the MTS 516 provides security mechanisms to keep each tenants data separate unless the data is shared. If more than one MTS is used, they may be located in close proximity to one another, e.g. in a server farm located in a single building or campus), or they may be distributed at locations remote from one another, e.g. one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application, e.g. RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

FIG. 6 illustrates elements of the MTS 616 and various interconnections in more detail. In this example, the network interface is implemented as one or more HTTP application servers 600. Also shown is system process space 602 including individual tenant process spaces 604, a system database 606, tenant database(s) 608 and a tenant management process space 610. The tenant database 608 might be divided into individual tenant storage areas 612, which can be either a physical arrangement or a logical arrangement. Within each tenant storage area 612, user storage 614 might similarly be allocated for each user.

It should also be understood that each application server 600 may be communicably coupled to database systems, e.g. system database 606 and tenant database(s) 608, via a different network connection. For example, one server $600_1$ might be coupled via the Internet 614, another server $600_{N-1}$ might be coupled via a direct network link, and another server $600_N$ might be coupled by yet a different network connection. TCP/IP are protocols for communicating between the servers 600 and the database system, however, it will be apparent to one skilled in the art that other transport protocols may be used to optimize the system depending on the network interconnect used.

In various optional aspects, each application server 600 is configured to handle requests for any user/organization. In one embodiment, therefore, an interface system (not shown) implementing a load balancing function, e.g. an F5 Big-IP load balancer) is communicably coupled between the servers 600 and the clients 612 to distribute requests to the servers 600. In one aspect, the load balancer uses a least connections algorithm to route user requests to the servers 600.

Other examples of load balancing algorithms, such as round robin and observed response time, also can be used. For example, in certain aspects, three consecutive requests from the same user could hit three different servers, and three requests from different users could hit the same server. In this manner, the MTS 616 is multi-tenant, wherein the MTS 616 handles storage of different objects and data across disparate users and organizations, As an example of storage, one tenant might be a company that employs a sales force where each salesperson uses the MTS 616 to manage their sales process. Thus, a user might maintain contact data, leads data, customer follow-up data, performance data, goals and progress data, etc., all applicable to that user's personal sales process, e.g. in the tenant database 608). In the MTS arrangement, since all of this data and the applications to access, view, modify, report transmit, calculate, etc., can be maintained and accessed by a client having nothing more than network access, the user can manage his or her sales efforts and cycles from any of many different clients. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by the MTS 616 that are allocated at the tenant level while other data structures might be managed at the user level. Because the MTS 616 might support multiple tenants including possible competitors, the MTS 616 should have security protocols that keep data, applications and application use separate. Also, because many tenants will opt for access to an MTS 616 rather than maintain their own system, redundancy, up-time and backup are more critical functions and need to be implemented in the MTS 616.

In addition to user-specific data and tenant-specific data, the MTS 616 might also maintain system level data usable by multiple tenants or other data. Such system level data might include industry reports, news, postings, and the like that are sharable among tenants.

In certain aspects, the clients 612 communicate with the application servers 600 to request and update system-level and tenant-level data from the MTS 616 that may require one or more queries to the database system 606 and/or database system 608. The MTS 616, e.g. an application server 600 in the MTS 616) generates automatically one or more SQL statements (the SQL query) designed to access the desired information. In use, the Internet 614 uses SOQL to communicate the initial query.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided For CRM database applications, such standard entities might include tables for account, contact, lead and opportunity data, each containing pre-defined fields.

According to one embodiment, for a table such as one for a standard entity, an additional set of one or more columns, e.g. 10, 100, or 250 columns, of text data are defined in the physical schema. These additional columns, also referred to herein as custom data columns, custom field columns or custom fields, allow a system administrator to define additional fields that are not included in the pre-defined standard fields for that entity. These custom fields may have a data-type of VARCHAR (variable length character). In one aspect, these custom fields are stored out of row from the main entity table, although these fields may be stored in the main table.

For example, if the main table is called "sales.account" then the custom field data might be stored in a table called "sales.account_cfdata" where "cf" stands for "custom field." Both of these tables contain an organization_id column to distinguish tenant rows, as well as the same indexed primary key, e.g. account id, in this case) that identifies those rows throughout the database. Furthermore, both tables are partitioned physically on the database, e.g. Oracle database) to encourage parallelization, for example, when necessary to act on the entire table for maintenance purposes and to maintain shallower indexes.

In various embodiments, the foregoing architectural example may further incorporate additional features found during reference to U.S. Patent Application Publication 2005/0223022 filed Apr. 2, 2004 and entitled CUSTOM ENTITIES AND FIELDS IN A MULTI-TENANT DATABASE SYSTEM, which is incorporated herein by reference in its entirety.

While various embodiments have been described above, it should be understood that they have been presented by way of example only, and not limitation. Thus, the breadth and scope of a preferred embodiment should not be limited by any of the above-described example embodiments, but should be defined only in the following claims and their equivalents.

What is claimed is:

1. A method for querying data relationships over a network, comprising:
   receiving a query including at least one relationship between a first entity and a second entity over a network, the query received utilizing a web services protocol including at least one of simple object access protocol (SOAP) and extensible markup language (XML), and the query including at least one hierarchical relationship between the first entity and the second entity;
   retrieving, from at least one database, only that amount of data related to the first entity and the second entity that is able to be efficiently returned responsive to the query, the at least one database including a multi-tenant database system; and
   transmitting data related to the first entity and the second entity over the network in response to the query, the data related to the first entity and the second entity being transmitted in response to a single query;
   wherein the query is constructed utilizing a query language.

2. The method of claim 1, wherein receiving a query including at least one relationship between a first entity and a second entity over a network includes:
   receiving the query over a network that is asynchronous and latent.

3. The method of claim 1, wherein at least one of the first entity and the second entity includes a custom entity.

4. The method of claim 1, wherein receiving a query including at least one relationship between a first entity and a second entity over a network includes:
   receiving the query utilizing a server.

5. The method of claim 1, wherein the first entity includes an account and the second entity includes at least one contact.

6. The method of claim 1, wherein retrieving, from at least one database, only that amount of data related to the first entity and the second entity that is able to be efficiently returned responsive to the query includes:
   cursoring over the first entity and the second entity.

7. The method of claim 6, further comprising tracking a total number of entities.

8. The method of claim 7, further comprising determining whether the total number of the entities exceeds a threshold.

9. The method of claim 8, further comprising deleting at least one of the entities when the threshold is exceeded.

10. The method of claim 1, wherein the relationship has a unique label.

11. The method of claim 10, wherein a first label is assigned to the first entity for identifying the relationship and a second label is assigned to the second entity for identifying the relationship.

12. The method of claim 11, wherein the first label and the second label are different.

13. The method of claim 1, wherein a pointer exists between the first entity and the second entity.

14. The method of claim 1, wherein the query includes a describe call that identifies the relationship.

15. The method of claim 1, wherein retrieving, from at least one database, only that amount of data related to the first entity and the second entity that is able to be efficiently returned responsive to the query includes:
   generating at least one database query based on the query for querying a database for the data.

16. The method of claim 15, wherein generating at least one database query based on the query for querying a database for the data includes:
   generating the at least one database query to include join conditions.

17. The method of claim 1, wherein the query including the at least one relationship between the first entity and the second entity provides the single query for requesting a plurality of entities for improving network throughput, faster response time and more efficient utilization of resources than otherwise provided by utilizing a plurality of queries, each for requesting a different one of the plurality of entities.

18. The method of claim 1, wherein the at least one relationship between the first entity and the second entity that is included in the query includes a parent-child relationship.

19. A computer readable storage medium storing a computer program, the computer program comprising:
   computer code for receiving a query including at least one relationship between a first entity and a second entity over a network, the query received utilizing a web services protocol including at least one of simple object access protocol (SOAP) and extensible markup language (XML), and the query including at least one hierarchical relationship between the first entity and the second entity;
   computer code for retrieving, from at least one database, only that amount of data related to the first entity and the second entity that is able to be efficiently returned responsive to the query, the at least one database including a multi-tenant database system; and
   computer code for transmitting data related to the first entity and the second entity over the network, in response to the query, the data related to the first entity and the second entity being transmitted in response to a single query;
   wherein the computer program is operable such that the query is constructed utilizing a query language.

20. A system, comprising:
   a processor;
   a multi-tenant database;
   an application program interface (API) for interfacing a client with the multi-tenant database over a network;
   wherein the processor is operable such that, in response to a query including at least one relationship between a first entity and a second entity, the API retrieves, from the multi-tenant database, only that amount of data related to the first entity and the second entity and able to efficiently returned responsive to the query and transmits data related to the first entity and the second entity from the multi-tenant database over the network;
   wherein the processor is operable such that the query is received utilizing a web services protocol including at least one of simple object access protocol (SOAP) and extensible markup language (XML);
   wherein the processor is operable such that transmitting data related to the first entity and the second entity over the network in response to the query includes:
   transmitting data related to the first entity and the second entity in response to a single query;
   wherein the query includes at least one hierarchical relationship between the first entity and the second entity;
   wherein the processor is operable such that the query is constructed utilizing a query language.

21. A computer readable storage medium storing a computer program, the computer program comprising:
   computer code for transmitting a query including at least one relationship between a first entity and a second entity over a network; and
   computer code for receiving data related to the first entity and the second entity over the network, the data retrieved from at least one database such that only that amount of data able to be efficiently returned responsive to the query is retrieved;

wherein the computer program is operable such that the query is transmitted utilizing a web services protocol including at least one of simple object access protocol (SOAP) and extensible markup language (XML);

wherein the computer program is operable such that the data is received in response to a single query;

wherein the query includes at least one hierarchical relationship between the first entity and the second entity;

wherein the at least one database includes a multi-tenant database system;

wherein the computer program product is operable such that the query is constructed utilizing a query language.

22. A method for transmitting code for querying data relationships over a network, the method comprising:

transmitting code to receive a query including at least one relationship between a first entity and a second entity over a network, the query received utilizing a web services protocol including at least of simple object access protocol (SOAP) and extensible markup language (XML), and the including at least one hierarchical relationship between the first entity and the second entity;

transmitting code to retrieve, from at least one database, only that amount of data related to the first entity and the second entity that is able to be efficiently returned responsive to the query, the at least one database including a multi-tenant database system; and transmitting code to transmit data related to the first entity and the second entity over the network in response to the query, the data related to the first entity and the second entity being transmitted in response to a single query;

wherein the query is constructed utilizing a query language.

* * * * *

UNITED STATES PATENT AND TRADEMARK OFFICE
CERTIFICATE OF CORRECTION

PATENT NO. : 7,734,608 B2
APPLICATION NO. : 11/534510
DATED : June 8, 2010
INVENTOR(S) : Fell et al.

Page 1 of 1

It is certified that error appears in the above-identified patent and that said Letters Patent is hereby corrected as shown below:

In the specification:
Col. 2, line 27, please replace "embodiment," with --embodiment.--;
Col. 5, line 1, please replace "raining" with --training--;
Col. 7, line 55, please replace "manner," with --manner.--;
Col. 8, line 62, please replace "402," with --402.--;
Col. 10, line 41, please replace "tenants" with --tenant's--;
Col. 11, line 33, please replace "organizations," with --organization.--.

In the claims:
Col. 16, line 2, please replace "least of" with --least one of--.

Signed and Sealed this
Seventh Day of June, 2011

David J. Kappos
*Director of the United States Patent and Trademark Office*